Patented Apr. 12, 1949

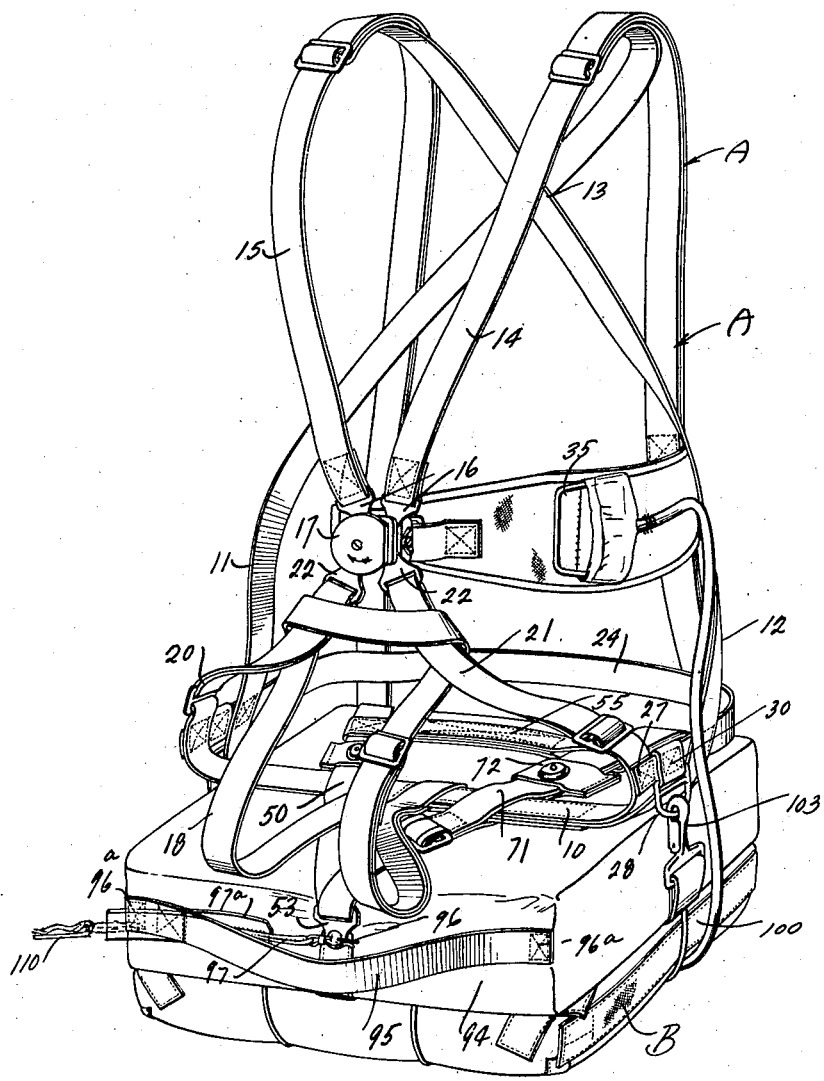

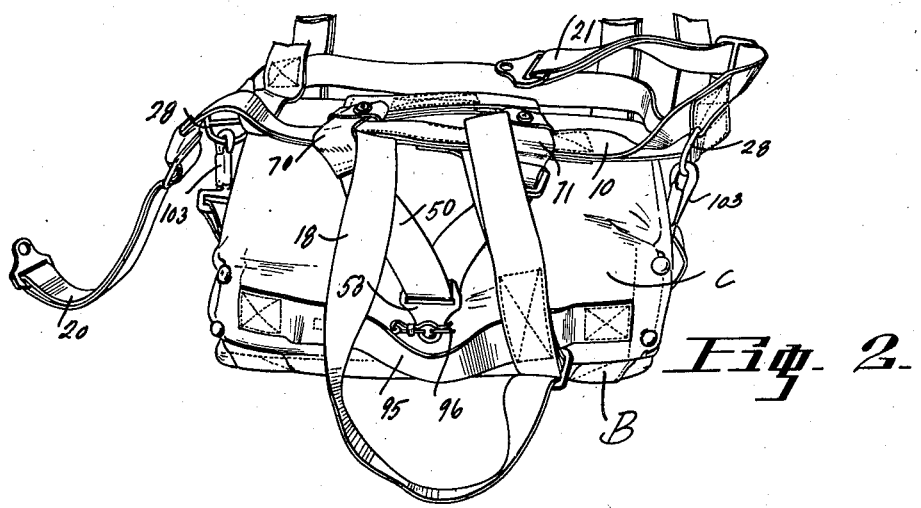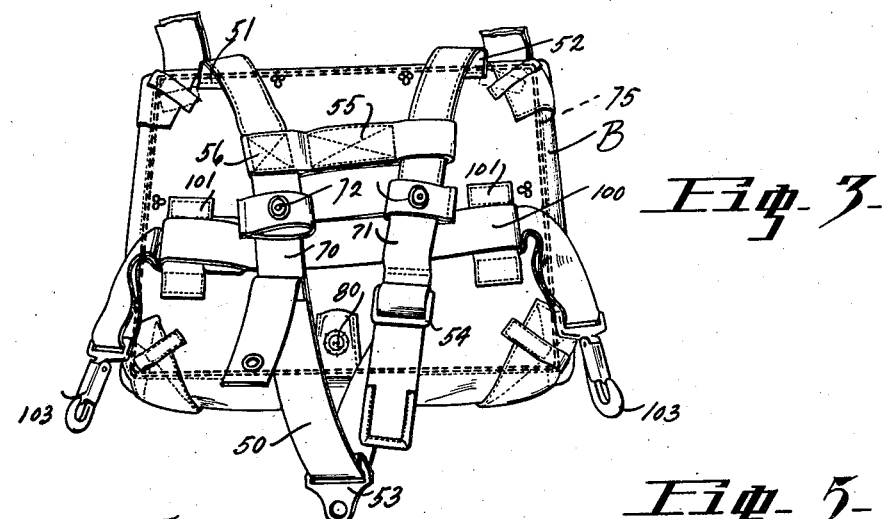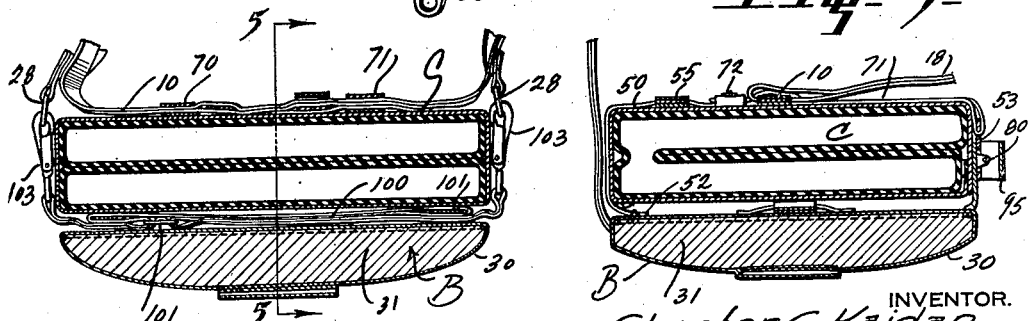

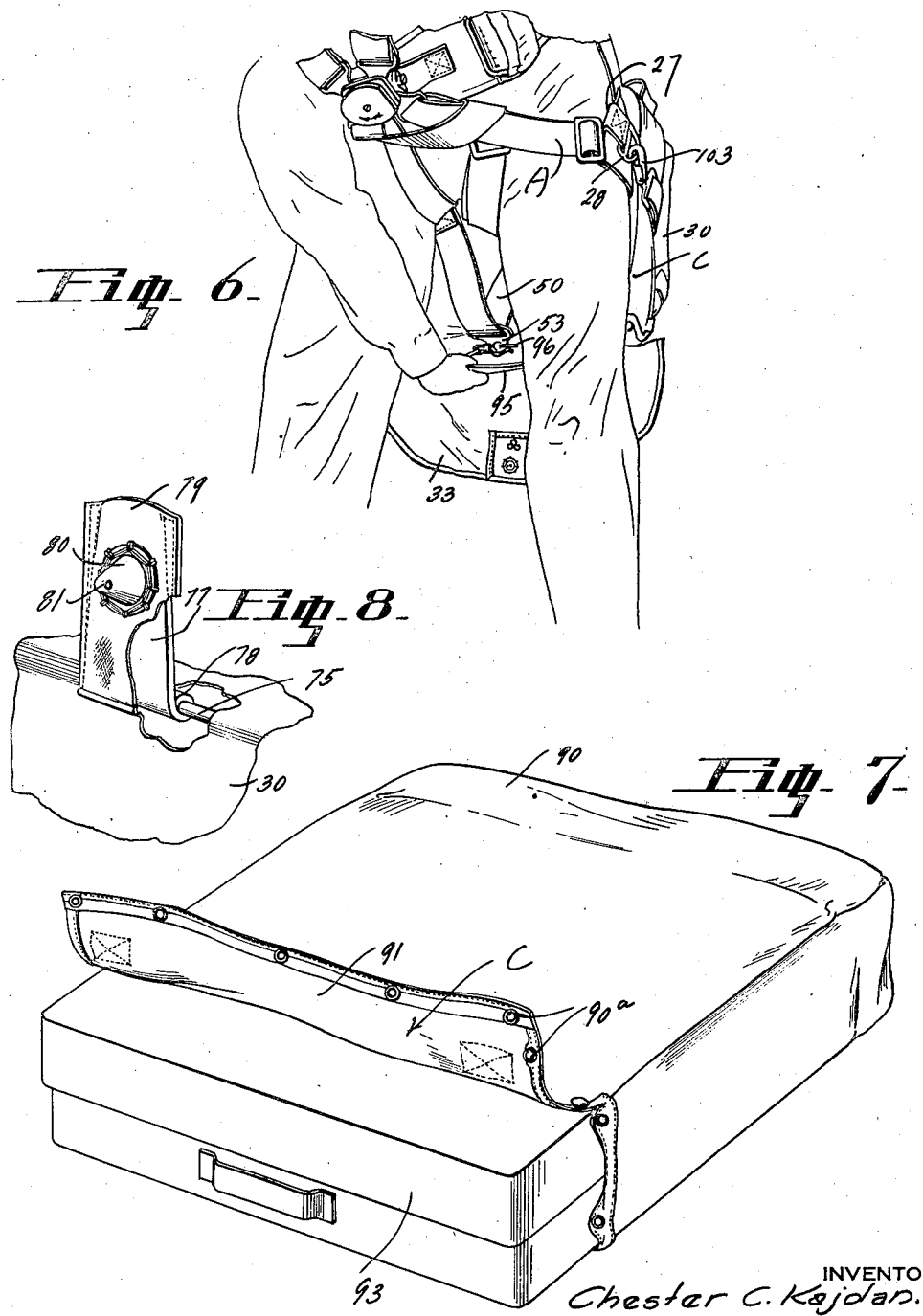

2,467,038

UNITED STATES PATENT OFFICE 2,467,038

PARACHUTE HARNESS, PACK, AND LIFE RAFT ASSEMBLY

Chester C. Kajdan, Buffalo, N. Y., assignor to Irving Air Chute Co. Inc., Buffalo, N. Y., a corporation Application August 13, 1945, Serial No. 610,489

22 Claims. (Cl. 244—148)

This invention relates to improvements in means for connecting a life raft with parachute equipment.

The primary object of this invention is the provision of improved means for directly associating a life raft with a parachute pack and harness.

A further object of the invention is the provision of improved means for directly connecting a life raft unit upon a parachute pack.

A further object of this invention is the provision of improved means for the direct connection of a life raft unit between a parachute pack and body harness of the wearer.

A further object of this invention is the provision of improved means for the compact and readily releasable association of a life raft in position between a parachute pack and the body of a wearer so that the parachute may be released from the pack and the life raft unit thereafter released with facility from its stowed position.

A further object of this invention is the provision of improved means for associating a life raft with a body harness of parachute equipment of the type adapted to receive a seat pack.

Other objects and advantages of this invention will be apparent during the course of the following detailed description.

In the accompanying drawings, forming a part of this specification, and wherein similar reference characters designate corresponding parts throughout the several views—

Figure 1 is a perspective view showing the complete assembly of the parachute harness, parachute pack and life raft unit.

Figure 2 is a perspective view showing portions of the harness released and the parachute unit associated therewith.

Figure 3 is a plan view showing the strap details of the parachute pack and harness by means of which the life raft unit is associated therewith; the latter not being shown in this view.

Figure 4 is a transverse cross sectional view taken through the life raft showing its association upon a parachute pack in connection with the sling of the harness.

Figure 5 is a front to back cross sectional view taken through the parachute pack, life raft unit and associated parts of the harness.

Figure 6 is a perspective view showing the mode of releasing the life raft from the harness and pack container after the parachute has been released.

Figure 7 is a perspective view showing a life raft and its associated container; these details comprising the life raft assembly.

Figure 8 is a fragmentary perspective view showing the manner of associating one of the fastener parts for the life raft unit with a parachute pack.

In the drawings, wherein for the purpose of illustration is shown only a preferred embodiment of the invention, the letter A may designate a parachute harness having a parachute seat pack B associated therewith and also an improved life raft unit C.

The harness A may be of any approved type, such as shown in any of the following patents: 1,560,366, 1,842,611, 1,899,656, 1,958,000, 2,130,564, 2,130,569. I prefer, however, to use the life raft unit with a single point release harness type. To that end the parachute harness may include a seat strap 10, commonly referred to as a sling, with which is associated side riser webs 11 and 12 crossing at the back at 13 and extending forwardly over the shoulder to provide front straps 14 and 15 having fasteners 16 at their ends for releasable connection with a single point release coupling 17 of well known construction. The sling 10 may have a leg loop strap 18 connected thereto for extension between the legs of the wearer. Furthermore the harness may include outer leg straps 20 and 21 having fastener parts 22 for releasable connection with the coupling 17 in well known manner. I provide a waist strap 24 connected with the ends of the sling of the harness and the riser webs 11 and 12 and therewith defining short portions 27 having coupling rings 28 connected therewith for connection with the life raft unit, as will be subsequently mentioned.

The parachute pack B is of the seat type including a flexible container 30 and parachute equipment 31 therein of well known construction. This parachute equipment generally includes a pilot parachute canopy and shroud lines and it has been designated by solid cross section, for purposes of clarity in Figures 4 and 5 of the drawings. The envelope container 30 of the seat type parachute B is provided with the usual flaps, one of which is designated at 33 in Figure 6 of the drawings, which are released by a rip cord arrangement designated at 35 in Figure 1, for releasing the parachute canopy and shroud lines.

Ordinarily the seat pack B is directly connected with the seat sling of the parachute, but in the present assemblage I prefer to locate the life raft unit C between the seat sling and pack. To that end I provide a strap arrangement upon the pack B, which is best shown in Figure 3 of the drawings, consisting of a strap or webbing 50 doubled intermediate its ends and secured at its ends 51 and 52 upon the container of the parachute pack along the rear margin thereof. The webbing 50 extends forwardly and is provided with a slidable fastener 53 thereon. I provide an adapter 54 for adjusting the length of this strap 50. It is noted that the fastened ends 51 and 52 are spaced inwardly slightly from the side of the pack, and the portions of the strap 50 extend convergently therefrom to the point of location of the fastener 53. I provide a cross strap 55 secured at one end 56 to one portion of the strap 50 and looped to slidably receive the other portion of the strap 50 therein; this strap 55 holding the proper spacing of the portions of the strap 50 and overlying the top wall of the parachute unit C near the rear thereof to hold the latter in position against dropping from the parachute assembly. I provide loops 70 and 71 upon the portions of the straps 50 releasable by snap fasteners at 72 for receiving therein the seat sling 10 of the harness, as indicated in Figure 1 of the drawings. These parts are, of course, detachable so that the harness may be detached from the strap 50.

The parachute pack container includes, as is usual, a rigid wire frame, a portion 75 of which is shown in Figure 8 in full lines and in dotted lines shown in Figure 3. This framework holds the shape of the pack, as is conventional. A rigid hinge 77 is hingedly connected at 78 upon this wire frame 75 in any approved manner and it is preferably fabric covered at 79 and provided with a stud 80 having transverse opening 81 therein. The hinge on which this stud is provided may move from front to back but not sidewise, for the purpose of adjustment fore and aft in order to accommodate life raft units of various sizes and to accurately position the stud with respect to the apertured fastener 53 so that a compact enclosure of the life raft unit may be obtained against liability of side movement and improper rip pin positioning.

In the assembly the life raft unit is positioned upon the back of the seat pack and the straps 50 brought forwardly over the rear and top wall of the life raft unit and the aperture of the fastener 53 slipped over the stud 80. Of course preliminary thereto the length of the strap 50 has been adjusted to insure that fore and aft there will be a snug connection of the life raft in this strap arrangement without loose play.

The life raft unit C includes a container 90 of flexible nature including top and bottom walls and marginal front and side walls and a rear closure wall 91 having snap fastener means 90ᵃ associated therewith for enclosing the life raft 93 therein. The front wall 94 of the container 90, shown best in Figure 1 of the drawings, has a flexible handle 95 stitched at its extreme ends 96ᵃ and looped intermediate the same.

To this handle 95 is attached a release pin 96 by means of a cord 97 or other flexible member, secured at 97ᵃ upon the inside of the handle spaced inwardly from the end connection 96ᵃ upon a free portion of the handle. This pin is of the cotter pin type and is adapted to be slipped thru the aperture of the stud 80 to hold the hinge connected with the fastener 53 in a manner shown in Figure 1 of the drawings. This compactly holds the life raft unit assembled upon the harness and the seat pack.

Laterally the life raft unit is held against movement by means of a length adjustable strap 100, best shown in Figure 3 of the drawings having an adapter 101 (Figure 4) therein for length adjustment. This strap is secured by loops 101 upon the back of the container of the seat pack and at its ends it extends laterally from the seat pack and is provided with snap couplings or fasteners 103 adapted for connection with the rings 28 of the harness above mentioned. The connection of the snap fasteners 103 with the rings 28 will, of course, hold the life raft unit in position against lateral movement both upon the body harness and upon the seat pack and will assure compact positioning of the entire assemblage upon the body of the wearer.

It will be noted that in Figure 1 the handle of the container of the life raft unit is provided with an auxiliary retaining pin 110. This pin is not intended to be used with the present means for associating with the life raft unit with a seat type pack, but rather it is used with the parachute equipment shown in my co-pending application Serial Number 610,488, filed August 13, 1945.

It is within the contemplation of this invention to use the life raft unit directly upon any type of parachute pack; the seat pack here being shown merely by way of example.

It will be noted that the coupling of the life raft unit in positio nupon the harness insures that the load of the life raft unit, as well as the pack, will be directly imparted to that part of the harness best adapted to receive the same.

It will be noted that lack of side motion of the hinge 77 prevents locking of the pin so that the stud is always in position to permit release of the pin when the handle is pulled.

From the foregoing the mode of operation will be apparent. During an emergency the wearer will jump from the aircraft and pull the rip cord, releasing the parachute canopy from the pack. Thereafter preferably when close to the water, the wearer will reach his hands between his legs, grasp the handle 95 and pull the same. This will pull the handle 95 outwardly and through connections 97 and 97ᵃ will release the pin 96 and enable the entire life raft unit to be pulled by the wearer from between the harness and the pack container. Thereafter the life raft 93 is removed from its envelope 90 and an air release valve (not shown) will be tripped during this operation to inflate the raft if the raft is of that type. The present invention is not concerned with any particular type of life raft and the illustration shown in the drawings is merely by way of example.

It will be noted that the two operating parts of the entire equipment are located at different points so that the operator need not be confused. The rip cord is upon the upper portion of the harness so that the handle may be readily grasped in normal manner, whereas the handle for release of the life raft unit is located at the seat between the legs of the wearer.

Various changes in the shape, size and arrangement of parts may be made to the form of invention herein shown and described, without departing from the spirit of the invention or the scope of the following claims.

I claim:

1. In a combination parachute and life raft assemblage the combination of a body harness including upper body attaching webbing and lower body attaching webbing, a parachute pack having means for attaching it to the harness, a rip cord for the pack having a handle, means releasably connecting the handle upon the upper webbing portion of the body harness, a life raft unit including containing means and a life raft, means for attaching the container means to the body harness, and rip means for the containing means of the life raft unit including a handle disposed at the lower body webbing of the handle remote from the pack rip cord handle.

2. In parachute equipment of the class described the combination of a body attaching harness, a parachute pack, means attaching the parachute pack to the harness, a life raft unit, means directly connecting the life raft unit upon the pack between the same and the harness and body of a wearer, and means to release the life raft unit from such position independent of release or actuation of said parachute pack while in assembled position upon a wearer.

3. In parachute equipment of the class described the combination of a harness, a parachute pack, a life raft unit mounted directly upon the pack, and coupling means connected with the pack and harness for releasable coupling around the marginal portions of the life raft unit.

4. In parachute equipment the combination of a parachute pack including a container, a releasable and inflatable life raft unit, and means connected with the parachute container for directly and releasably connecting the life raft unit to the container of said pack.

5. In parachute equipment a body harness including supporting webs, a parachute pack including a container, coupling means connected with the container for releasably connecting the pack with the supporting webs of the harness, an inflatable life raft unit interposed between said pack container and the harness (and body of the wearer when the harness is upon the wearer's body), and means to manually release said life raft unit from such position.

6. In parachute equipment of the class described the combination of a parachute pack including a container for a parachute canopy, a life raft unit including an envelope and a life raft releasably positioned therein, and means on the container of the parachute pack for releasably mounting the life raft unit upon the container.

7. In parachute and life raft equipment the combination of a harness including a seat sling, a seat type parachute pack having means for connecting the same to said sling, a life raft unit, means for compactly releasably supporting the life raft unit upon the pack between the same and the seat sling of the harness, and means to reelase said life raft unit from said position without releasing the pack from said sling.

8. In parachute and life raft equipment the combination of a harness including a seat sling, a seat type parachute pack, a life raft unit, means for compactly releasably supporting the life raft unit upon the pack between the same and the seat sling of the harness, including means releasably holding the side portions of the life raft against lateral movement, and front and rear means preventing front and rear movement of the life raft unit relative to the pack.

9. In a combination parachute pack and life raft unit the combination of a parachute pack including a container therefor, holding means upon the container of the pack for releasably holding the life raft unit directly assembled upon the pack, including a fastener and releasing means, and a handle for the life raft unit having said releasing means connected therewith constructed and arranged to release the life raft from said pack by pulling upon the handle.

10. In parachute and life raft equipment the combination of a parachute harness including a seat sling, a seat type parachute pack, a life raft, flexible retention means upon the pack for releasably holding the life raft thereon, and means on said flexible retention means for connection with the seat sling.

11. In parachute and life saving equipment the combination of a parachute pack including a container, a life raft unit, strap means mounted upon said container including a fastener for releasably holding the strap means upon the container and attaching the life raft unit thereto, and means for connecting said strap means with a parachute harness.

12. In parachute and life raft equipment the combination of parachute harness including lower body strap portions, a parachute pack, means for connecting the parachute pack with the lower body strap portions of the harness, a life raft releasably interposed between the pack and the lower body strap portions, and means on the pack for releasably fastening the life raft unit to the pack.

13. In parachute and life raft equipment the combination of parachute harness including lower body strap portions, a parachute pack, means for connecting the parachute pack with the lower body strap portions of the harness, a life raft interposed between the pack and the lower body strap portions, means on the pack for releasably attaching the life raft unit to the pack, and means for attaching said last mentioned means with the lower body strap portions of the harness.

14. In a parachute pack and life raft saving device the combination of a parachute pack including a container having a wall portion thereon, strap means at opposite marginal portions of the container having interconnectable fastener portions, a life raft held upon said pack by said strap means, said life raft including a handle portion, and releasing means for the fastener means on said handle portion adapted to release the fastener means and permit release of the life raft upon pulling upon said handle.

15. In combination parachute and life raft equipment comprising a harness, a parachute pack, means for connecting the parachute pack with the harness, and means for independently releasably connecting a life raft upon said pack and harness.

16. In combination a parachute pack, a life raft unit, releasable fastening means mounting the life raft unit upon the pack, and means upon the life raft unit including a handle portion for release of said fastening means and release of the life raft from said pack.

17. Parachute harness including a supporting sling, a parachute pack of the seat type, side coupling members connecting the sides of the pack with the seat sling, a life raft unit, and releasable fastening means for holding the life raft unit upon said pack interposed between the same and said sling.

18. Parachute harness including a supporting sling, a parachute pack of the seat type, side coupling members connecting the sides of the pack with the seat sling, a life raft unit, and releasable fastening means for holding the life raft unit upon said pack interposed between the same and said sling, including a handle having means for releasing said fastening means.

19. A parachute assembly comprising a pack having a container and frame work supporting the container in position, a hinged member swingable in a definite plane against lateral movement, retaining means on the container, fastener parts on the retaining means and said hinged member, a life raft unit releasably positioned upon the container held in position by the fastening of said hinged member with retaining means, and releasing means for said fastener member.

20. A parachute assembly comprising a pack having a container and frame work supporting the container in position, a hinged member swingable in a definite plane against lateral movement, retaining means on the container, fastener parts on the retaining means and said hinged member, a life raft unit releasably positioned upon the container held in position by the fastening of said hinged member with said retaining means, and releasing means for said fastener member, including a handle connected with the life raft for releasing the same and having said releasing means connected therewith constructed and arranged so that a pull upon the handle will release said fastener and permit release of the life raft.

21. In a combination parachute pack and life raft construction the combination of a parachute pack including a container and canopy releasably contained therein, a second container, means for attaching the second container to the container of the pack, a life raft releasably supported in the second container, and means to release the life raft from the second container.

22. In combination a parachute pack and life raft unit equipment the combination of a single point release parachute harness including lower attaching webbing and upper body attaching webbing and a waist strap attached thereto, a parachute pack for housing a parachute canopy, rip cord means for the parachute pack including a releasable handle disposed upon said waist strap, a life raft unit including containing means, release means for the containing means including a handle, and fastener parts for the release means attached to the handle so that a pull upon the handle will enable release of the life raft, said handle for the release means of the life raft unit being disposed below and remote from the waist band mounting of the parachute pack rip cord handle.

CHESTER C. KAJDAN.

REFERENCES CITED

The following references are of record in the file of this patent:

UNITED STATES PATENTS

| Number | Name | Date |
| --- | --- | --- |
| 2,114,301 | Harrigan | Apr. 19, 1938 |
| 2,130,547 | Irvin | Sept. 20, 1938 |
| 2,380,372 | Alderfer | July 31, 1945 |